(12) United States Patent
Gu (10) Patent No.: US 11,667,344 B2
(45) Date of Patent: Jun. 6, 2023

(54) QUICK REPLACEMENT STRUCTURE FOR SEAT CUSHION OF EXERCISE BIKE

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 327 days.

(21) Appl. No.: 17/163,560

(22) Filed: Feb. 1, 2021

(65) Prior Publication Data
US 2022/0242509 A1    Aug. 4, 2022

(51) Int. Cl.
*B62J 1/28*    (2006.01)

(52) U.S. Cl.
CPC ...................................... *B62J 1/28* (2013.01)

(58) Field of Classification Search
CPC ......... B62J 1/28; B62J 1/08; B62J 1/02; B62J 1/10; A63B 2225/09; A63B 22/0046; A63B 22/0605; B62K 3/00; B62K 5/00; B62K 3/04; B62K 3/06; B62K 3/10; B62K 3/14
See application file for complete search history.

(56) References Cited

U.S. PATENT DOCUMENTS

| | | | |
|---|---|---|---|
| 2008/0150332 A1* | 6/2008 | Chen | B62J 1/08 297/214 |
| 2009/0174237 A1* | 7/2009 | Chen | B62J 1/08 297/215.13 |
| 2010/0320815 A1* | 12/2010 | Hsu | B62J 1/08 297/215.13 |
| 2011/0253849 A1* | 10/2011 | Chen | B62J 1/08 248/158 |
| 2013/0228668 A1* | 9/2013 | D'Aluisio | B62J 1/08 248/629 |
| 2014/0308071 A1* | 10/2014 | Darley | B62J 1/08 403/322.4 |
| 2016/0023702 A1* | 1/2016 | Lin | B62J 1/08 297/215.15 |

* cited by examiner

*Primary Examiner* — Andrew S Lo
*Assistant Examiner* — Andrew M Kobylarz (57) ABSTRACT

A quick replacement Structure for a seat cushion of an exercise hike is disclosed. The quick replacement structure includes an adaptor member, a rotation unit and a quick release assembly. The rotation unit is assembled between the adaptor member and seat bows of the seat cushion, and the adaptor member can be conveniently fastened on the exercise bike in cooperation with the quick-release assembly so that a user can quickly replace the preferred seat cushion.

7 Claims, 8 Drawing Sheets

QUICK REPLACEMENT STRUCTURE FOR SEAT CUSHION OF EXERCISE BIKE

BACKGROUND OF THE INVENTION

1. Field of the Invention

The present invention relates to a structure for replacement of a seat cushion of an exercise bike.

2. Description of the Related Art

Poor weather, outdoor temperature and time of day are often factors that limit people from exercising. In the other hand, indoor exercise is not limited by climate and temperature, so people usually do not give up the idea of performing indoor exercise. Among indoor exercise fitness apparatuses, the apparatuses mainly used to train the lower body include, fbr example, treadmills, scooters and exercise bikes. For example, Taiwan invention Patents No. 1587890 and 1616221, China Utility Model Patents No, CN211836092U, CN211885145U and CN211357588U and China Invention Patent No. CN10702939313 disclose exercise bikes. Most of the seat cushions on the general fitness bicycles have the function of vertically or horizontally adjusting position; for example, Taiwan Invention Patent No. 1690352 and China Utility Model Patent No. CN210813773U disclose seat cushions having the position adjusting function.

Because of limited indoor space and financial considerations, family users often share an exercise bike; according to the personal preferences, some family members may prefer a competition-type seat, but some family members may prefer a wide and comfortable seat, and the original configuration of the seat on the exercise bike cannot meet the preferences of all family members.

SUMMARY OF THE INVENTION

The present invention provides a quick replacement structure for a user to mount on a preference seat cushion, so that each family member's riding experience during exercise can be satisfied.

In order to achieve the aforementioned objective and effect, the present invention provides a quick replacement structure for a seat cushion of an exercise bike, and the quick replacement structure includes an adaptor member, a rotation unit, a d a quick-release assembly. The adaptor member includes a rotation part and a support part. The rotation part includes a rotation hole, and the support part includes a support hole, and an axial direction of the rotation hole is different from an axial direction of the support hole, and the support hole has a lateral cut hole cut through an outer surface of the support part along an axial direction, and the support part includes a pair of lug members respectively disposed aside the lateral cut hole. The rotation unit includes a pair of support bases and a support axle set, and each of the pair of support bases includes an insertion cylinder part and an exposed part, the insertion cylinder parts of the pair of support bases are inserted into and fastened in two ends of the rotation hole, respectively. When the support axle set is inserted through and assembled with the pair of support bases to form a locked state, the exposed parts of the pair of support bases clamp the two opposite side surfaces of the rotation part. Each of the exposed parts of the pair of support bases includes a bow-shaped clamping groove configured to hook and buckle one of a pair of seat bows of a seat cushion. The quick-release assembly movably is inserted into and assembled with the pair of lug members and configure to change a gap between the pair of lug members, so that an axle section of the exercise bike is mounted and fastened in the support hole.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art, Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. As used herein, the term "or" includes any and all combinations of one or more of the associated listed items.

It will be acknowledged that when an element or layer is referred to as being "on," "Connected to" or "coupled to" another element or layer, it can be directly on, connected or Coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 5. As shown in FIGS. 1 to 5, a quick replacement structure 100 for a seat cushion of an exercise bike includes an adaptor member 200, a rotation unit 300 and a quick-release assembly 500. The adaptor member 200 includes a rotation part 210 and a support section 220, and the rotation part 210 includes a rotation hole 211, and the support part 220 includes a support hole 221. An axial direction of the rotation hole 211 is different from an axial direction of the support hole 221, and the support hole 221 has a lateral cut hole 222 cut through an outer surface of the support part 220 along an axial direction of the support hole 221. The support part 220 includes a pair of lug members 223 respectively disposed aside the lateral cut hole 222. The rotation unit 300 includes a pair of support bases 310 and a support axle set 320, and each support base 310 includes an insertion cylinder part 311 and an exposed part 312, the insertion cylinder parts 311 of the pair of support bases 310 are inserted into and fastened in two ends of the rotation hole 211, respectively. When the support axle set 320 is inserted through and assembled with the pair of support bases 310 to form a locked state, the exposed parts 312 of the pair of support bases 310 can clamp the two opposite side surfaces of the rotation part 210. Each exposed part 312 of the support base 310 includes a bow-shaped clamping groove 314 configured to hook and buckle one of a pair of seat bows 410 of a seat cushion 400. A quick-release assembly 500 is movably inserted into and assembled with the pair of lug members 223 and configured to change a gap between the pair of lug members 223, so that an axle section 610 of the exercise bike 600 can be mounted and fastened in the support hole 221.

Figure 6:
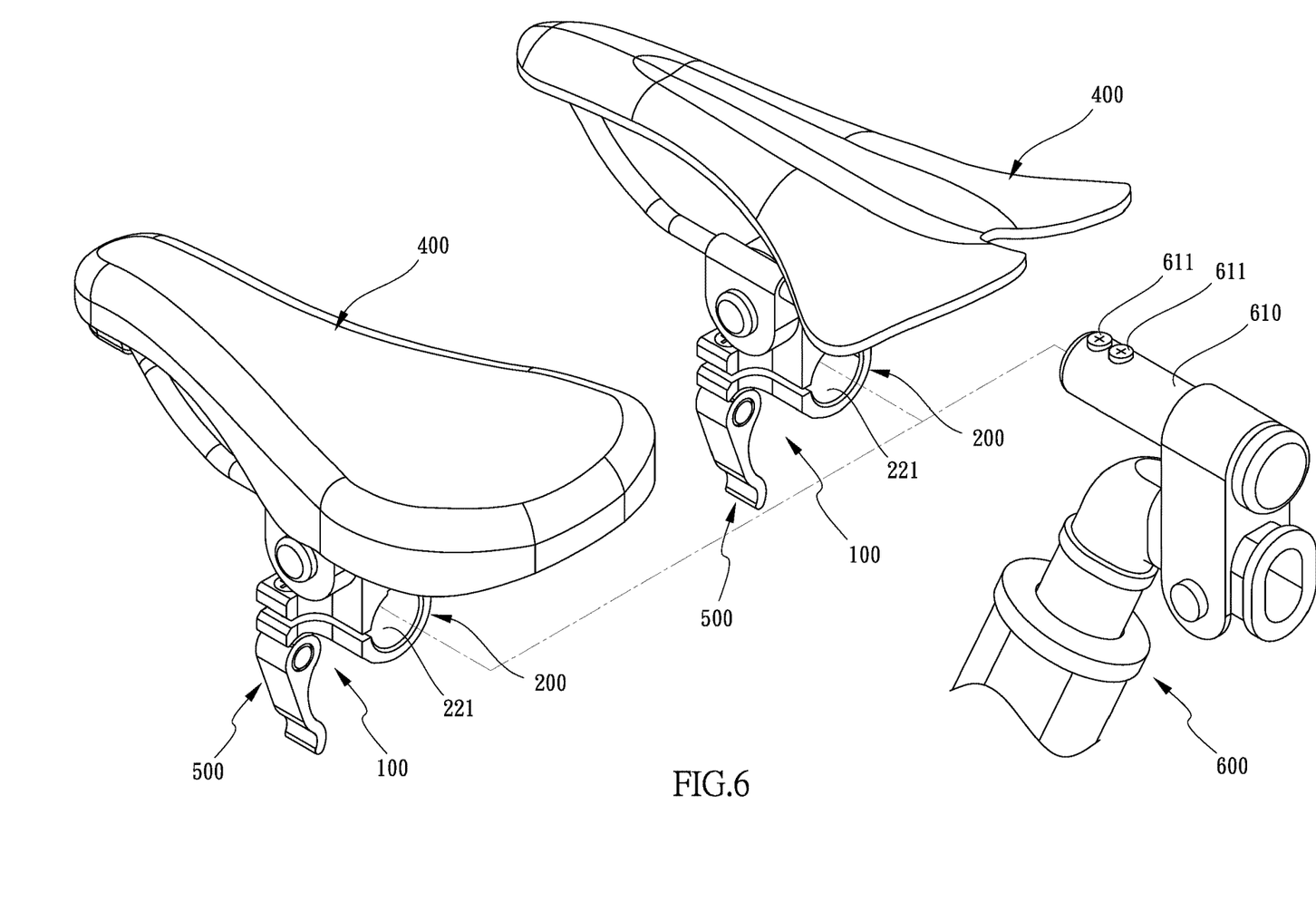
FIG. 6 is a schematic view showing an operation of replacing a seat cushion of exercise bike.

Please refer to FIG. 6, In order to replace the seat cushion, a user can Mount the aforementioned quick replacement structure with a preference seat cushion 400 first, and then detach the original seat cushion 400 of the exercise bike 600 from the axle section 610, and mount the axle section 610 of the exercise bike 600 into the support hole 221 of the adaptor member 200, and use the quick-release assembly 500 to clamp and fasten the support hole 221 of the adaptor member 200 on the axle section 610, so that the seat cushion 400 can be replaced quickly and conveniently, thereby providing the riding experience satisfying the personal preference; for example, the bottom left portion of FIG. 6 shows a wide and thick type seat cushion 400, and the top right portion of FIG. 6 shows a thin type seat cushion 400 for competition, these two seat cushions 400 can be replaced quickly. As a result, the above-mentioned quick replacement structure can achieve the objective and effect of the present invention.

Figure 7:
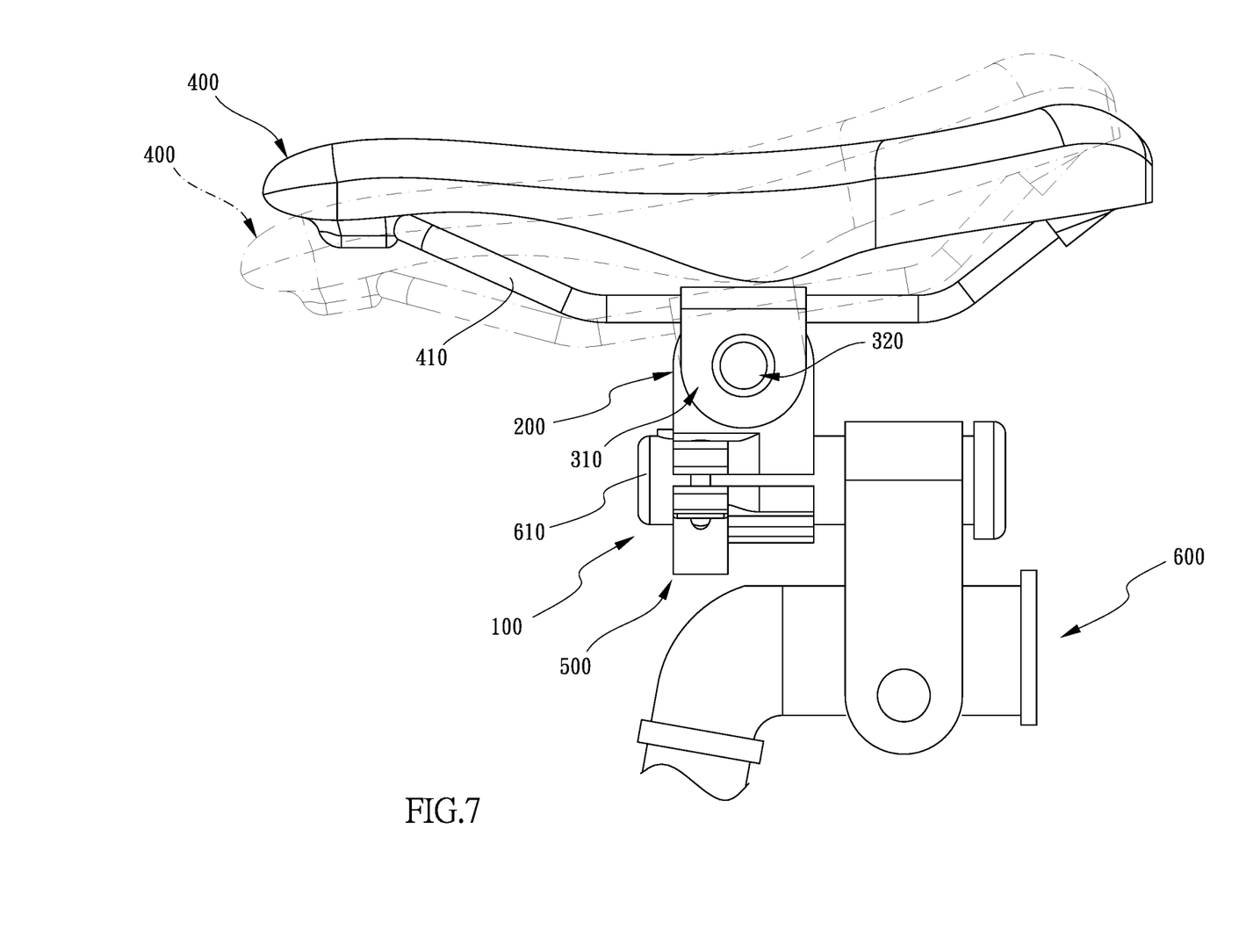
FIG. 7 is a schematic view showing an operation of adjusting a tilt angle of a seat cushion via a quick replacement structure of the present invention.

The details of features and assembly of components of the quick replacement structure of the present invention are illustrated in detail in following paragraphs. Please refer to FIGS. 1, 2 and 7. The rotation hole 211 has an inner curved teeth section 212 annularly formed on a hole wall thereof, and the inner teeth of the inner curved teeth section 212 are arranged along the axial direction of the rotation hole 211. The insertion cylinder part 311 of each support base 310 has an outer curved teeth section 313 formed on an outer periphery thereof and configured to engage with a part of the inner curved teeth section 212. The support axle set 320 includes a bolt 321 and a nut 122, and the bolt 321 is inserted into the exposed parts 312 and the insertion cylinder parts 311 of the pair of support bases 310 and in cooperation with the nut 322 to abut against the outer surface of the exposed part 312 of one of the pair of support bases 310. After the support axle set 320 is loosened, the insertion cylinder parts 311 of the pair of support bases 310 can be rotated relative to the rotation hole 211, so that the tilt angle of the seat cushion 400 can be adjusted, for example, in FIG. 7, a solid line indicates the angle of the seat cushion 400 before adjustment, and a dashed line indicates the angle of the seat cushion 400 after adjustment. After adjustment, the support axle set 320 can be locked tightly. Particularly, when the support axle set 320 is locked with the pair of support bases 310, the outer curved tooth section 313 is engaged with the inner curved teeth section 212 to prevent the pair of support bases 310 from rotating when the support bases 310 are clamped with the rotation part 210.

Figure 2:
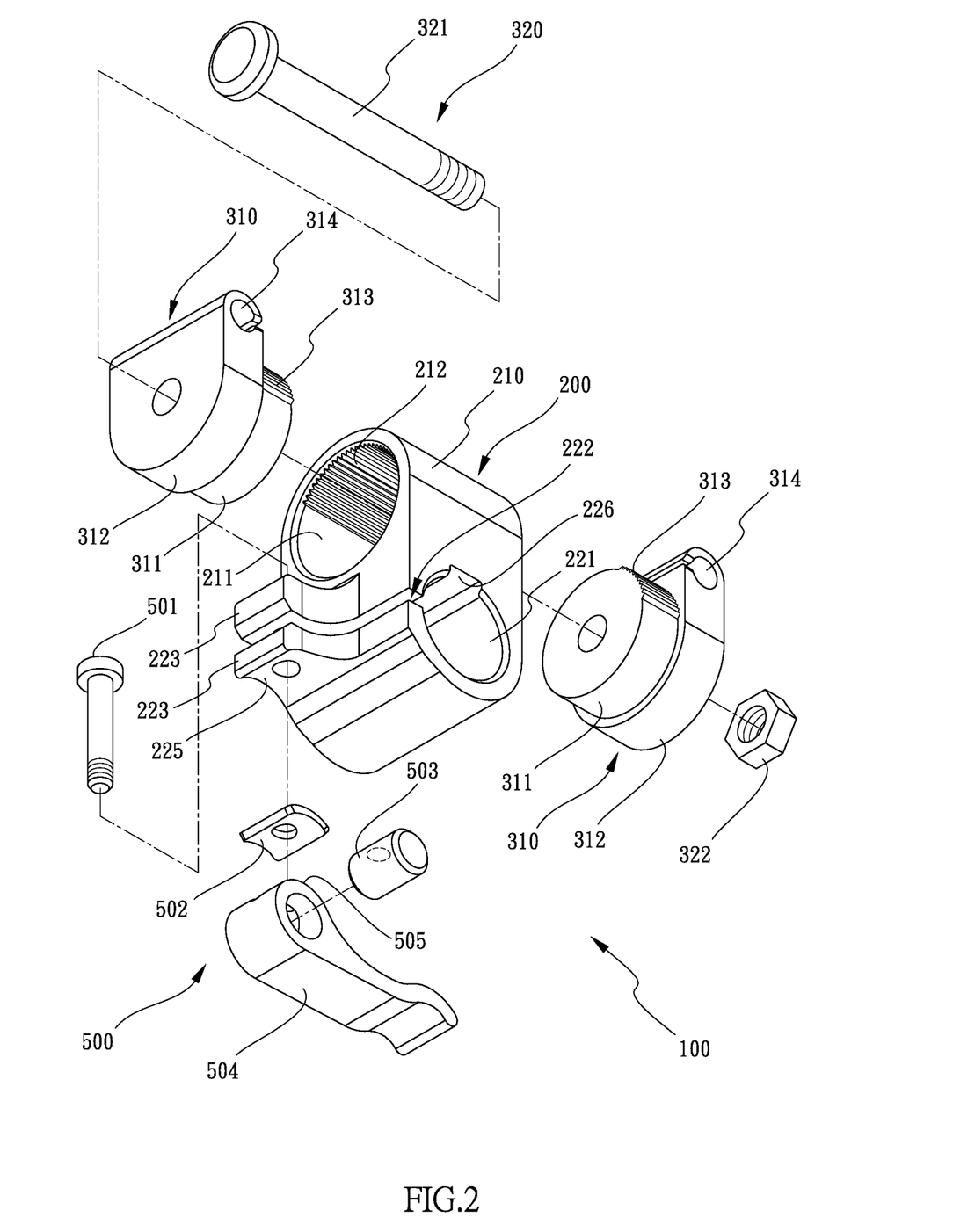
FIG. 2 is a perspective: exploded view of a quick replacement structure for an exercise bike cushion, according to the present invention.
Figure 8:
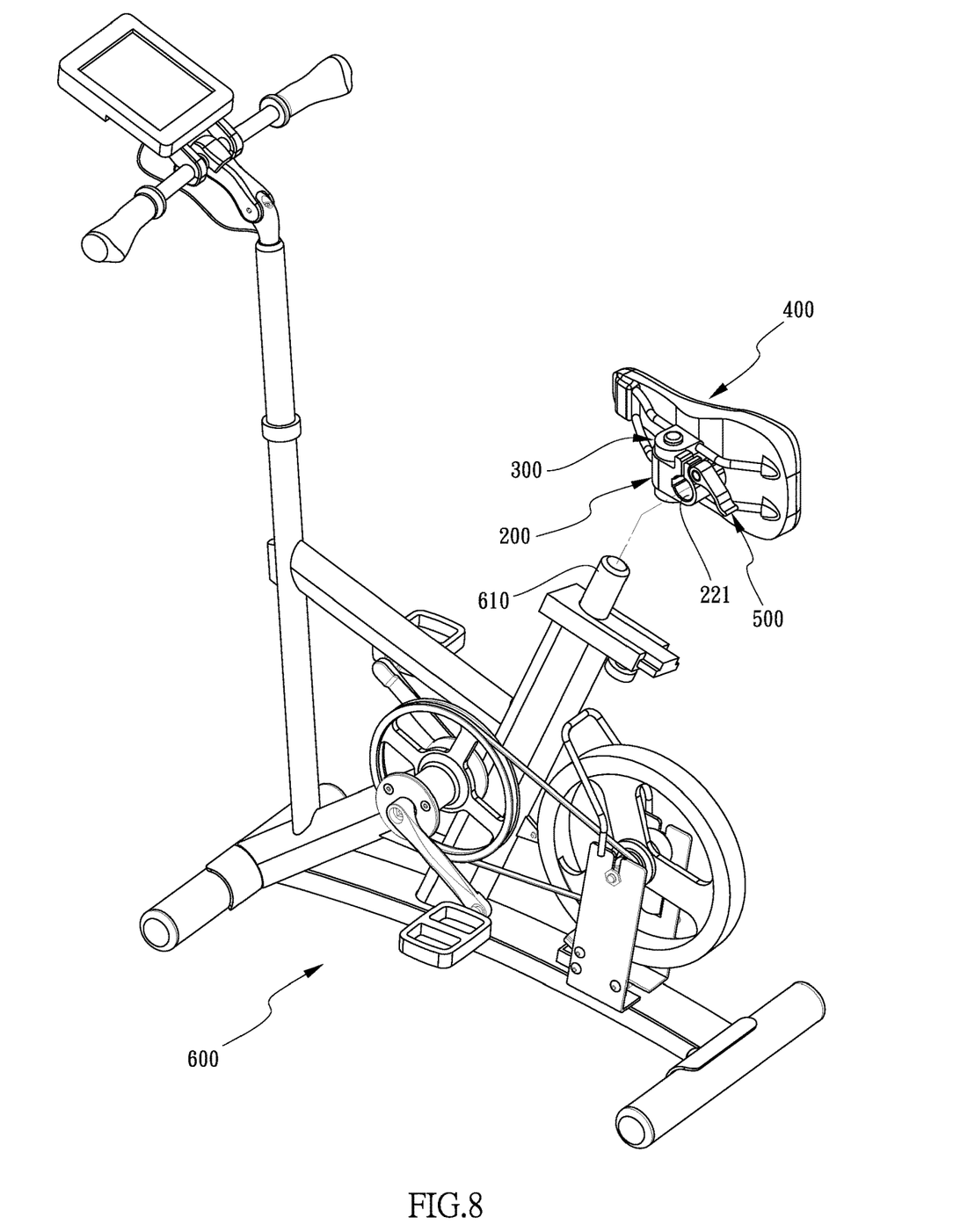
FIG. 8 is a schematic view showing another operation of mounting a quick replacement structure of the present invention on an exercise bike.

It is worth noting that the inner carved teeth section 212 has a length approximately being a half of a perimeter of the rotation hole 211, and the outer curved teeth section 313 has a length approximately shorter than a half of a perimeter of the insertion cylinder part 311, as shown in FIG. 2. The rotational angle between the adjustable adaptor member 200 and the rotation unit 300 of the present invention is approximately in a range of 90 degrees, so the aforementioned embodiment with the aforementioned rotation range can be applied to an exercise hike 600 having a horizontal axle section 610, or an exercise hike 600 having a vertical axle section 610 as shown in FIG. 8.

Figure 1:
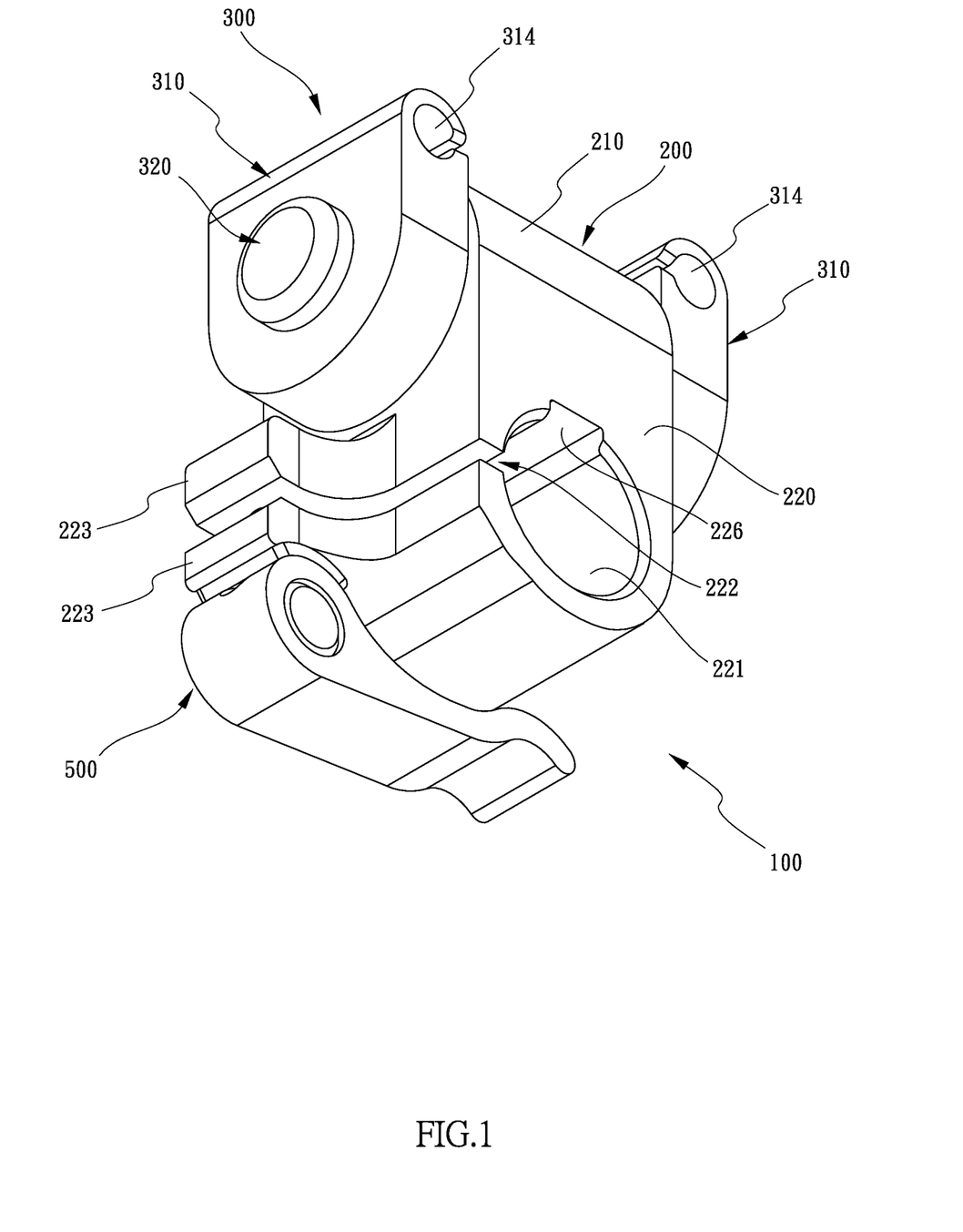
FIG. 1 is a perspective assembly view of a quick replacement structure for an exercise hike cushion, according to the present invention.
Figure 3:
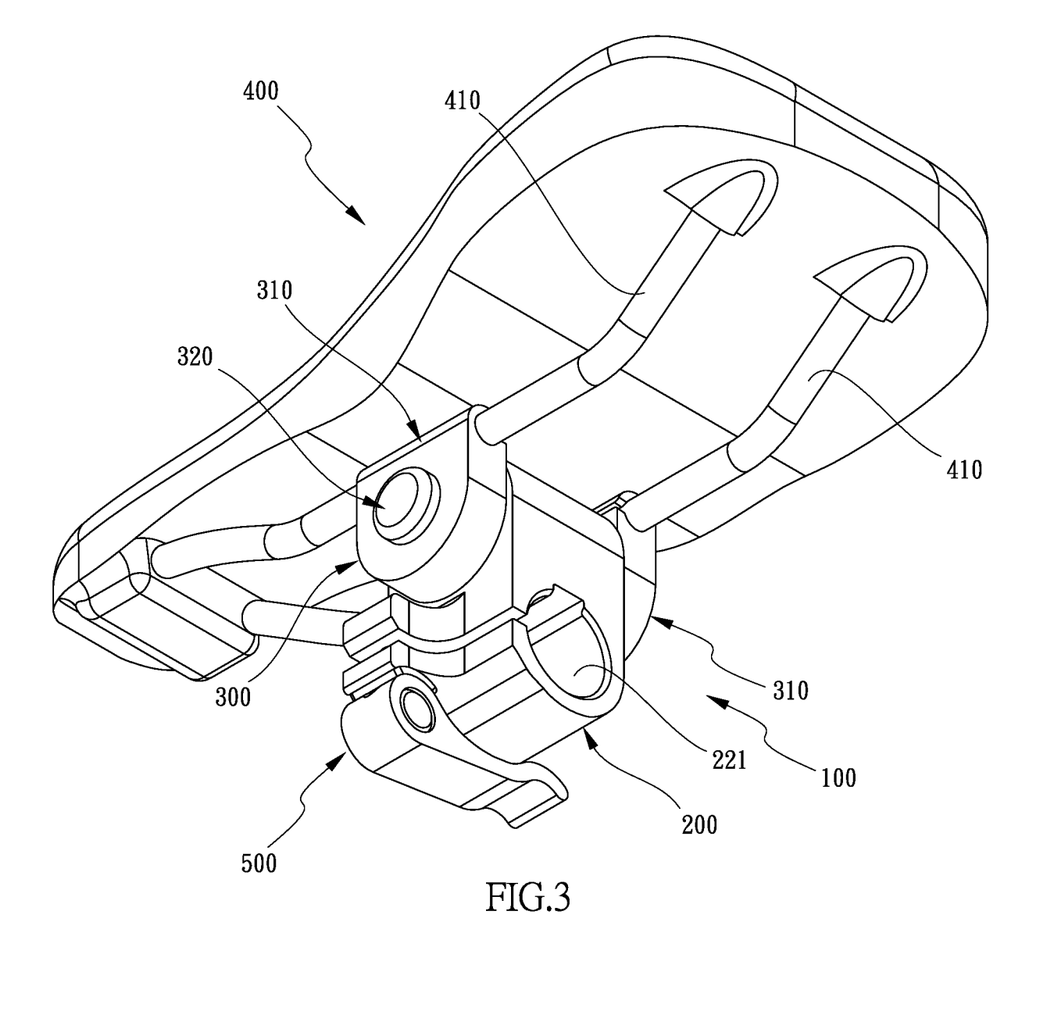
FIG. 3 is a perspective assembly view of a quick replacement structure mounted on a seat cushion, according to the present invention.
Figure 4:
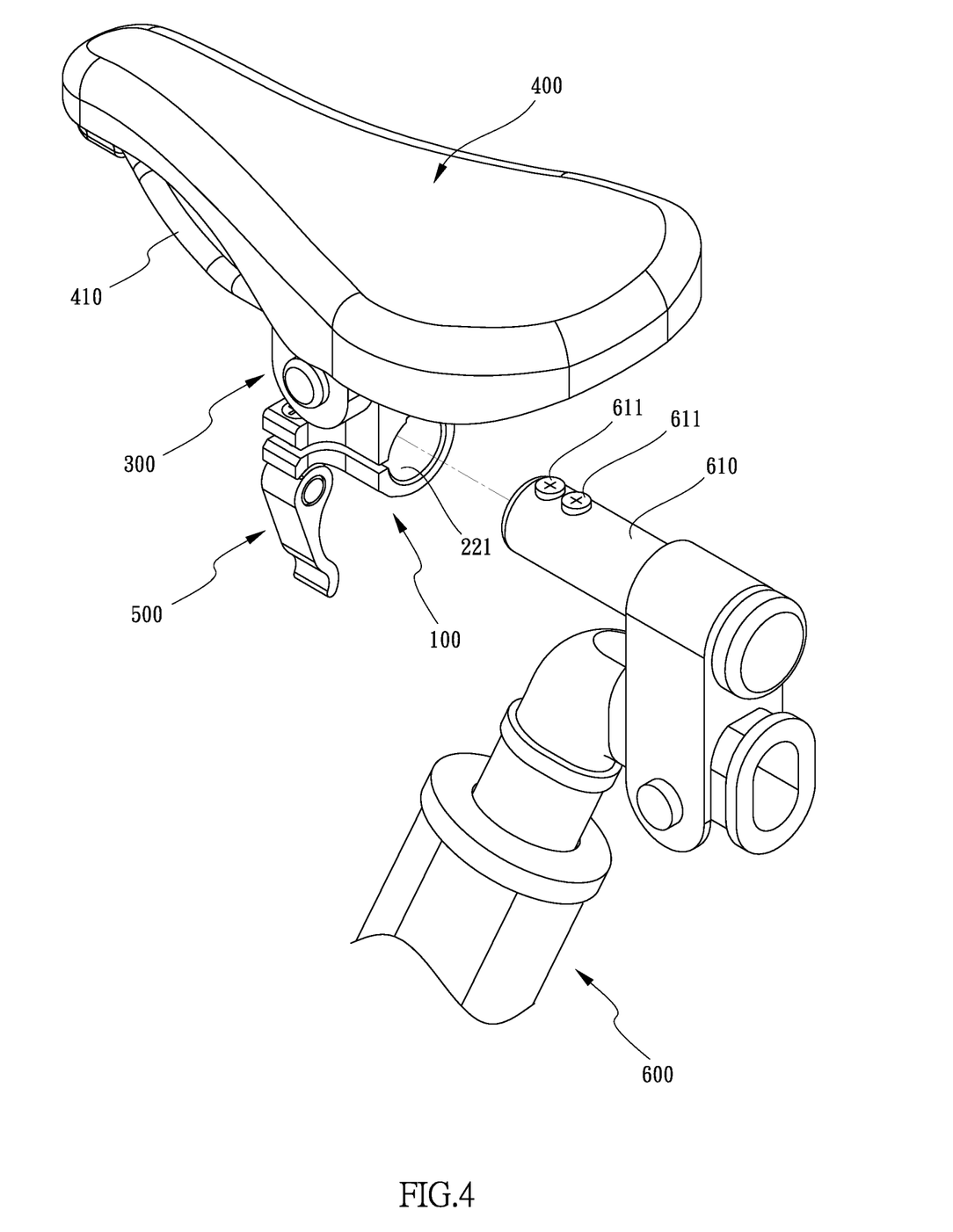
FIG. 4 is a perspective view of a quick replacement structure of the present invention before being mounted on an exercise bike.
Figure 5:
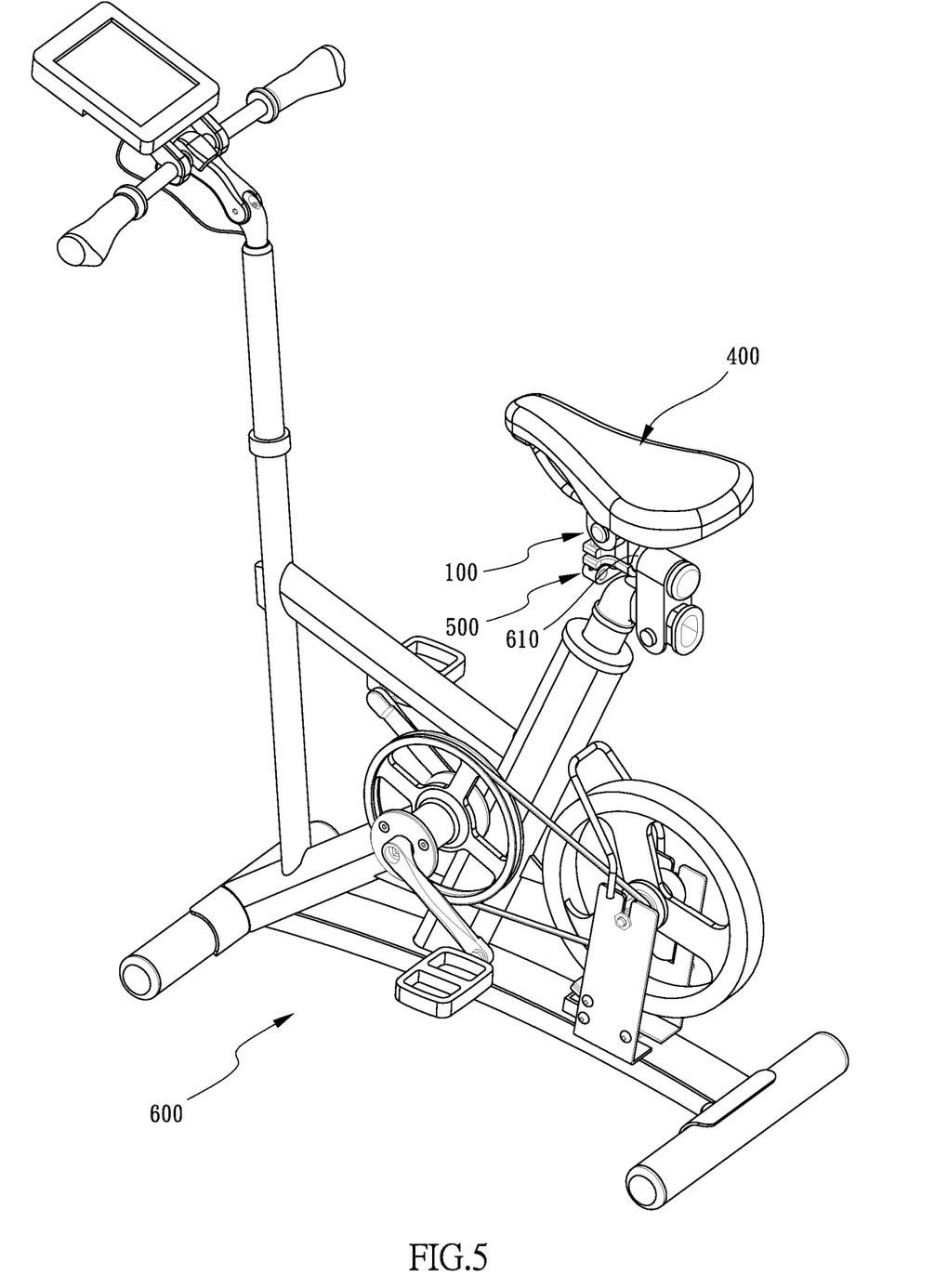
FIG. 5 is a perspective view of a quick replacement structure of the present invention after being mounted on an exercise hike.

Please refer to FIGS. 1 to 3. The quick-release assembly 500 includes a quick release screw rod 501, a washer 502, an inner screw tube 503, and a pull buckle 504. The quick release screw rod 501 is inserted through the pair of lug members 223 and an end of the quick release screw rod 501 is inserted through the washer 502 to screw with the inner screw tube 503. The inner screw tube 503 is mounted with an end of the pull buckle 504, and the end of the pull buckle 504 mounted with the inner screw tube 503 is abutted against one of the pair of lug members 223. One of the pair of lug members 223 has an inner concave surface 225, and the pull buckle 504 has an outer convex surface SOS corresponding to the inner concave surface 225.

Furthermore, when the insertion cylinder parts 311 of the pair of support bases 110 are inserted into and fastened in two ends of the rotation hole 211, the insertion cylinder parts 311 of the pair of support bases 310 are not in contact with each other. The support hole 221 has a dodge groove 226 formed thereon along the axial direction and facing the rotation hole 211 and configured to accommodate at least one screw 611 on the axle section 610. The axle section 610 indicates the horizontal axle section 610 of the exercise bike 600. The openings of the bow-shaped clamping grooves 314 of the pair of support bases 310 face toward the adaptor member 200 and are limited by the circumferential side of the adaptor member 200, so as to prevent the seat bows 410 from separating from the openings.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A quick replacement structure for a seat cushion of an exercise bike, comprising:

an adaptor member comprising a rotation part and a support part, wherein the rotation part comprises a rotation hole, and the support part comprises a support hole, and an axial direction of the rotation hole is different from an axial direction of the support hole, and the support hole has a lateral cut hole cut through an outer surface of the support part along an axial direction, and the support part comprises a pair of lug members respectively disposed aside the lateral cut hole;

a rotation unit comprising a pair of support bases and a support axle set, and each of the pair of support bases comprises an insertion cylinder part and an exposed part, the insertion cylinder parts of the pair of support bases are inserted into and fastened in two ends of the rotation hole, respectively, and when the support axle set is inserted through and assembled with the pair of support bases to form a locked state, the exposed, parts of the pair of support bases clamp the two opposite side surfaces of the rotation part, and each of the exposed parts of the pair of support bases comprises a bow-shaped clamping groove configured to hook and buckle one of a pair of seat bows of a seat cushion; and a quick-release movably inserted into the pair of lug members, an axle section of the exercise bike fastened in the support hole, the support hole comprising a dodge groove formed thereon along the axial direction and facing the rotation hole and configured to accommodate at least one screw on the axle section.

2. The quick replacement structure according to claim 1, wherein the rotation hole has an inner curved teeth section annularly formed on a hole wall thereof, and the insertion cylinder part of each of the pair of support bases has an outer curved teeth section formed on an outer periphery thereof and configured to engage with a part of the inner curved teeth section.

3. The quick replacement structure according to claim 2, wherein the support axle set comprises a bolt and a nut, and the bolt is inserted into the exposed parts and the insertion cylinder parts of the pair of support bases and in cooperation with the nut to abut against the outer surface of the exposed part of one of the pair of support bases.

4. The quick replacement structure according to claim wherein the inner curved teeth section has a length approximately being a half of a perimeter of the rotation hole, and the outer curved teeth section has a length approximately shorter than a half of a perimeter of the insertion cylinder part.

5. The quick replacement structure according to claim 1, wherein the quick-release comprises a quick release screw rod, a washer, an inner screw tube, and a pull buckle, and the quick release screw rod is inserted through the pair of lug members and an end of the quick release screw rod is inserted through the washer to screw with the inner screw tube, and the inner screw tube is mounted with an end of the pull buckle, and the end of the pull buckle mounted with the inner screw tube is abutted against one of the pair of lug members.

6. The quick replacement structure according to claim 5, wherein one of the pair of lug members comprises an inner concave surface, and the pull buckle comprises an outer convex surface corresponding to the inner concave surface.

7. The quick replacement structure according to claim 1, wherein when the insertion cylinder parts of the pair of support bases are inserted into and fastened in two ends of the rotation hole, the insertion cylinder parts of the pair of support bases are not in contact with each other.

* * * * *